(12) United States Patent
Ebacher

(10) Patent No.: US 6,210,108 B1
(45) Date of Patent: Apr. 3, 2001

(54) METHOD FOR MAKING AN ARTICLE PORTION SUBJECT TO TENSILE STRESS AND STRESS RELIEVED ARTICLE

(75) Inventor: Susan E. Ebacher, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/375,107

(22) Filed: Aug. 16, 1999

(51) Int. Cl.[7] ....................................................... B23P 15/00
(52) U.S. Cl. ..................... 415/189; 415/174.2; 29/889.1; 29/402.11; 228/119; 83/917
(58) Field of Search ............................. 415/170.1, 174.2, 415/189, 191, 208.1, 208.2, 209.2, 209.3, 209.4, 210.1; 29/889.1, 402.09, 402.11, 402.13; 228/119, 189, 165, 159; 83/917

(56) References Cited

U.S. PATENT DOCUMENTS

| | | | |
|---|---|---|---|
| 4,283,956 | * 8/1981 | Lechner et al. | 73/799 |
| 4,536,932 | * 8/1985 | Athey | 29/156.8 |
| 4,611,744 | * 9/1986 | Fraser et al. | 228/119 |
| 5,071,313 | * 12/1991 | Nichols | 415/134 |
| 5,994,678 | * 11/1999 | Zhao et al. | 219/530 |
| 6,049,978 | * 4/2000 | Arnold | 29/889.1 |

* cited by examiner

Primary Examiner—Edward K. Look
Assistant Examiner—Liam McDowell
(74) Attorney, Agent, or Firm—Andrew C. Hess; Nathan D. Herkamp

(57) ABSTRACT

A wall first portion of an article is provided with reduced tensile stress, of an amount less than that which can result in cracking of the wall, with an elongated opening through the wall first portion. The opening separates areas of a wall first portion and extends generally toward a wall second portion under a lower or different stress.

6 Claims, 2 Drawing Sheets

METHOD FOR MAKING AN ARTICLE PORTION SUBJECT TO TENSILE STRESS AND STRESS RELIEVED ARTICLE

BACKGROUND OF THE INVENTION

This invention relates to an article including a member that, during operation, includes a portion subject to tensile stress of an amount that can result in cracking of the member. More particularly, the invention relates to a turbine engine component including a wall having a portion subject to low cycle fatigue (LCF) cracking from tensile stress during operation.

Gas turbine engines generally include nozzles, for example turbine nozzles, including a plurality of spaced-apart stationary airfoil shaped vanes supported between generally circumferentially disposed band type members, sometimes referred to as shrouds or shroud segments. One example of such a structure is described in U.S. Pat. No. 5,343,694—Toborg et al. (patented Sep. 6, 1994). An inner surface of such a band or shroud segment is exposed to the flow of fluid under pressure, for example pressurized gas including air and products of combustion. Efficiency of the engine is based, in part, on the avoidance of leakage of such pressurized fluid out of the fluid stream.

In some gas turbine engine designs, it has been observed that certain portions of such a band, particularly on the flowpath side of a turbine nozzle vane or vane segment, during operation are under a relatively high amount of tensile type of stress. During cyclic operation of the engine, such tensile stress results from a cyclic type of bending of the band, sometimes referred to as chording. For example, such high tensile stress portions have been observed in the band in the vicinity of vane leading edges, trailing edges, or both. The relatively high amount of tensile stress can be sufficiently high to result, during operation, in the formation of a LCF crack in the band. At the same time, other, adjacent portions of the same band are in compression or under a tensile stress in an amount less than that which would result in LCF cracking. The LCF crack in the band extends from the high tensile stress portion of the band generally toward, and stops at, the band portion under compressive stress or lower tensile stress.

It has been a practice to repair such cracks by methods including one or a combination of welding, diffusion bonding (some forms of which are referred to as Activated Diffusion Healing), brazing, etc. However, such repair methods can be relatively temporary as well as time consuming and expensive. Sometimes attempts to repair such a crack in a component are unsuccessful, resulting in scrapping of the component. Preparation of new components to avoid such cracking as well as a crack repair of operated components, resulting in a restructured article and that extends the operating life of an article requiring less frequent repair, is highly desirable.

BRIEF SUMMARY OF THE INVENTION

The present invention, in one form, provides a method for making a wall of an article, the wall including a location in a wall first portion subject during operation to tensile stress that can result in cracking of the wall first portion, and a wall second portion subject during operation to a stress less than that which will result in cracking of the wall second portion. The method comprises removing material from the location in the wall first portion to provide an elongated opening through the wall first portion extending in the wall first portion generally toward the wall second portion. In another form, the present invention provides a method for repairing a crack in a wall of such an article, comprising removing material from the wall first portion about the crack to provide such elongated opening through the wall first portion, replacing the crack with the opening.

In still another form, the present invention provides an article comprising a wall first portion subject during operation to tensile stress that can result in cracking of the wall first portion, and a wall second portion subject during operation to a stress less than that which will result in cracking of the wall second portion. The wall first portion includes an elongated opening there through extending in the wall first portion generally toward the wall second portion, the elongated opening reducing the tensile stress in the wall first portion.

DETAILED DESCRIPTION OF THE INVENTION

Figure 5:
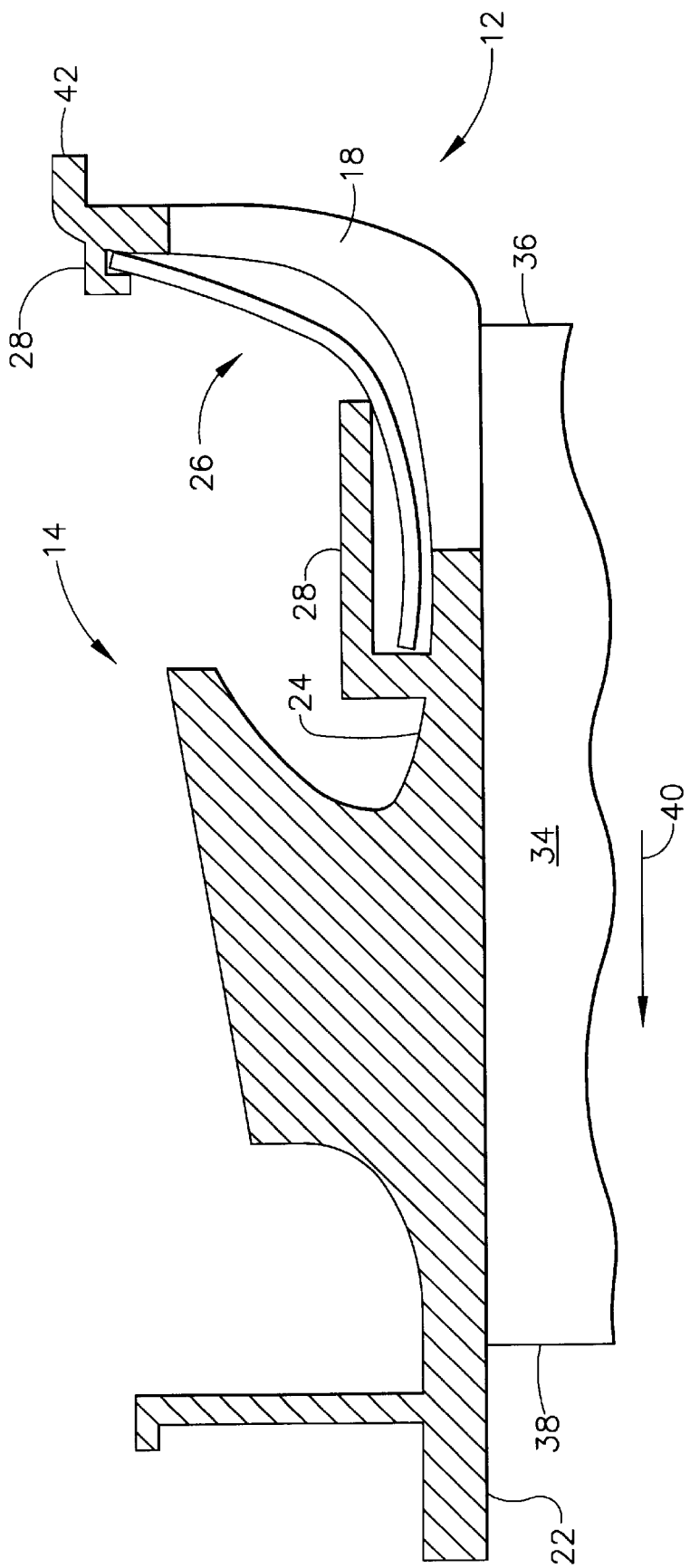
FIG. 5 is a sectional view of a gas turbine engine turbine nozzle outer band with a gas seal disposed over an opening on the non-flowpath wall surface.

Examination of gas turbine engine nozzle outer bands, generally of the type shown in FIG. 5 and made of high temperature superalloys typically used in gas turbine engines, has disclosed the existence of LCF cracks at a location in a band first portion under relatively high tensile stress. The cracks at such location extended toward and stopped at a band second portion under lower tensile stress or under compression. The type of engine operation that results in such conditions has been described above. The cracks, originating in the band portion under relatively high tension and relieving the high tensile stress in that location, extended toward but not into the band second portion. According to a form of the present invention, repair of a crack in a wall of a member, for example a gas turbine engine nozzle outer band, includes providing an opening through the wall to replace the crack in a portion subject to cracking under tension. In another form, a fluid seal over the opening is disposed on the non-flowpath surface of the band to avoid fluid leakage from the fluid flowpath through the opening. In another form of the method of the present invention, such a wall is prepared, prior to cracking during use, by providing such an opening.

Figure 1:
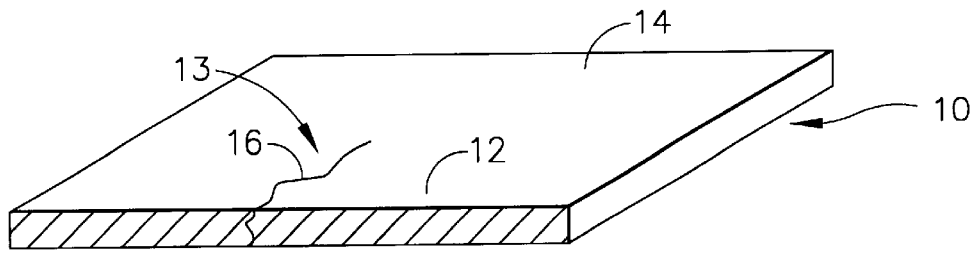
FIG. 1 is a diagrammatic sectional view of a member, representing an article wall, including a crack in a high tensile stressed portion.

The present invention will be more fully understood by reference to the drawings. In the diagrammatic sectional view of FIG. 1, a member or wall, shown generally at 10, represents a wall of an article or a replacement article substantially the same as the article. For example, the wall has been made of a high temperature superalloy band or band segment of a gas turbine engine nozzle. The wall includes a wall first portion 12 including a location generally at 13, subject during operation to tensile stress in an amount that can result in cracking of wall first portion 12, for example LCF failure or cracking. Wall 10 includes a wall second portion 14 that is not subject during operation to a stress that will result in cracking of wall second portion 14. For example, such lower stress can be a smaller tensile stress less than that which would result in LCF cracking. In some article designs, the second portion is under compression during operation. Evaluation of operated article or member 10 after operation has disclosed a crack 16 at location 13 in wall first portion 12, crack 16 resulting from excessive tensile stress in wall first portion 12.

Figure 2:
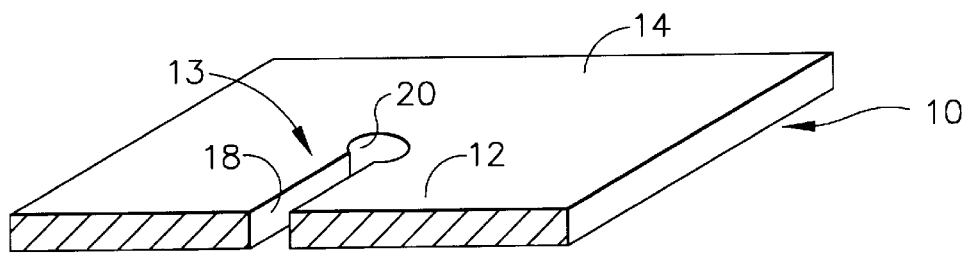
FIG. 2 is a diagrammatic sectional view of the type of member as in FIG. 1 including a slot type elongated opening through the wall in the tensile stressed portion, replacing the crack with the opening.

According to a form of the present invention shown in FIG. 2, an elongated opening 18, for example a slot, is provided through wall 10 at location 13, about crack 16. Opening 18 replaces crack 16 with elongated opening 18, separating areas of the wall first portion 12 and selected to provide relief of tensile stress developed in first wall portion 12 during operation. Elongated opening 18 at location 13 extends through wall 10 from wall first portion 12 toward wall second portion 14 which, during operation is not under a stress which will result in the formation of a crack, for example a LCF failure crack. In one preferred form of the invention, elongated opening 18 extends through wall 10 at least up to second wall portion 14, for example which is under compression.

Elongated opening 18 can be generated through wall 10 by a variety of known material removal methods including one or a combination of electrodischarge machining, mechanical drilling or machining, laser cutting, electrochemical machining, grinding, etc. In one embodiment, it is preferred to remove any potential stress concentrations, frequently called stress risers, at an opening end 20 of elongated opening 18 by relieving any relatively sharp corners. For example, such relief can be provided by drilling a hole at end 20 as shown in FIG. 2.

Figure 3:
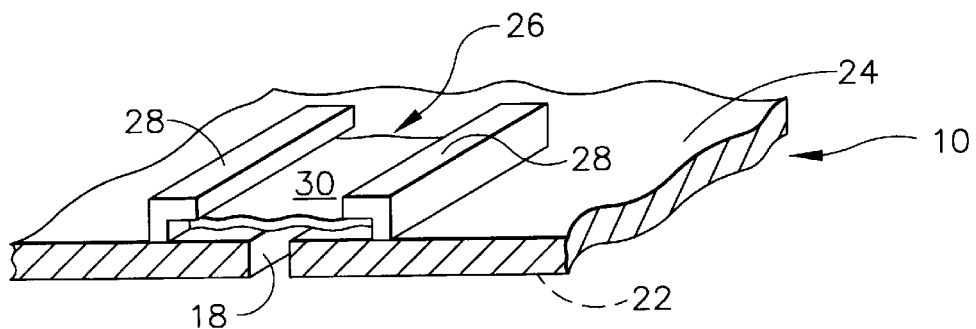
FIG. 3 is a diagrammatic fragmentary sectional view of the member of FIG. 2 with one form of a fluid seal disposed over the opening on a non-flowpath wall surface.

In FIG. 3, the member of FIG. 2 represents a wall of a gas turbine engine component, for example the outer band of a turbine nozzle, having a flowpath surface 22 and a non-flowpath surface 24. In some examples, elongated opening 18 is sufficiently large to allow excessive leakage of fluid, such as gas from the flowpath surface or cooling air from the non-flowpath surface, or both, between flowpath surface 22 and non-flowpath surface 24. Then, a fluid seal shown diagrammatically generally at 26 in FIG. 3 is provided in one form of the present invention. In the embodiment of FIG. 3, fluid seal 26 includes substantially rigid spaced-apart seal retainers 28, secured with non-flowpath surface 24. Held between seal retainers 28 is a seal 30, shown to be in the form of a flexible or spring-like member to accommodate flexing of the wall during operation. For example, such a flexible seal member has been made of a high temperature Ni base alloy commercially available as IN 718 alloy.

Figure 4:
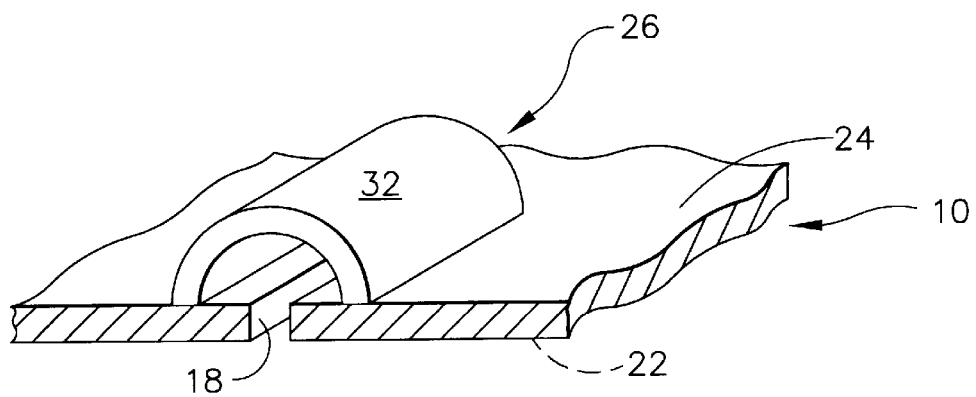
FIG. 4 is a diagrammatic fragmentary sectional view of the member of FIG. 2 with another form of a fluid seal disposed over the opening on the non-flowpath wall surface.

The diagrammatic fragmentary sectional view of FIG. 4 shows a form of fluid seal 26 in the shape of a C-channel 32 secured with surface 24 of wall 10. Seal retainers 28 in FIG. 3 and C-channel 32 in FIG. 4 can be secured with surface 24 by a variety of convenient bonding means capable of withstanding the conditions of operation. For operation in a gas turbine engine, bonding includes fusion welding, tack welding, brazing, etc.

The fragmentary sectional view of FIG. 5 shows wall 10 as one embodiment of a gas turbine engine turbine nozzle outer band segment, made of a high temperature Ni base superalloy commercially available as Rene' 80 alloy. Wall or band 10 assists other nozzle portions in supporting a plurality of nozzle vanes, a portion of one of which is shown at 34. Vane 34 includes a leading edge 36 and a trailing edge 38, within a gas flowpath represented by arrow 40. An elongated opening 18 is provided at the above identified location 13 in wall first portion 12 in which, during engine operation, tensile stresses were generated at a level sufficient to result in cracking, for example crack 16 in FIG. 1, of wall first portion 12. Opening 18 extends through the band toward wall second portion 14 which, in this design during engine operation, is in compression and resists the formation and the propagation of cracks, for example of the type shown in FIG. 1. Frequently, a crack will extend through edge 42 of wall 10. In that example, opening 18 extends through edge 42, constituting a separation in wall first portion 12. To avoid leakage of gas from flowpath 40 through opening 18, flexible gas seal 26 generally of the type described in connection with FIG. 3, is secured over opening 18 on non-flowpath surface 24.

One form of the present invention provides a replacement article, represented by wall 10 in the drawings, substantially the same as an operated article in which it has been observed that a crack developed in a wall during operation. Elongated opening 18 is provided in the replacement article 10 at location 13 of crack 16 in the operated article to avoid cracking in the replacement article at location 13 during operation of the replacement article. Such a location 13 is identified by evaluation of the operated article after operation.

The present invention, in its various forms as methods and articles, has been described in connection with specific examples, embodiments and materials. However, it should be understood that they are intended to be representative of, rather than in any way limiting on, its scope. Those skilled in the various arts involved will understand that the invention is capable of variations and modifications without departing from the scope of the appended claims.

What is claimed is:

1. In a method for making a wall of an article, the wall including a location identified in a wall first portion subject during operation to tensile stress that can result in cracking of the wall first portion, and a wall second portion subject during operation to a stress less than that which will result in cracking of the wall second portion, the wall including a wall fluid flowpath surface and a wall non-flowpath surface; comprising removing material from the location in the wall first portion to provide an elongated opening at the location through the wall first portion extending in the wall first portion generally toward the wall second portion; and, disposing a fluid seal over the opening on the wall non-flowpath surface.

2. The method of claim 1 for making a gas turbine engine article including a wall in the form of a band member in which:

the wall includes a wall gas flowpath surface and a wall non-flowpath surface; and, a gas seal is disposed over the opening on the wall non-flowpath surface.

3. The method of claim 1 for repairing a crack in the wall first portion of the article, comprising;

removing material from the wall first portion from about the crack to provide the elongated opening through the wall first portion replacing the crack; and, disposing a fluid seal over the opening on the wall non-flowpath surface.

4. An article including a wall comprising a wall first portion subject during operation to tensile stress that can result in cracking of the wall first portion, and a wall second portion subject during operation to a stress less than that which will result in cracking of the wall second portion, the wall including a wall fluid flowpath surface and a wall non-flowpath surface; wherein:

the wall first portion includes an elongated opening through the first wall portion and extending in the wall first portion generally toward the wall second portion, the elongated opening reducing the tensile stress in the wall first portion; and, a fluid seal is disposed over the elongated opening on the wall non-flowpath surface.

5. The article of claim 4 in the form of a gas turbine engine component including a band as the wall, in which:

the band includes a band gas flowpath surface and a band non-flowpath surface; and, a gas seal is disposed over the elongated opening on the band non-flowpath surface.

6. The article of claim 5 in the form of a gas turbine engine turbine nozzle segment including a plurality of vanes carried between inner and outer bands, at least one of the bands including the elongated opening there through.

* * * * *